3,359,173
LIQUID EXCURSION PULSED REACTOR
L. D. Percival King, Santa Fe, N. Mex., assignor to the United States of America as represented by the United States Atomic Energy Commission
Filed Apr. 5, 1967, Ser. No. 628,789
5 Claims. (Cl. 176—47)

ABSTRACT OF THE DISCLOSURE

A highly supercritical slug of liquid fuel from a heavily poisoned region is propelled into a large cavity, the walls of which are cooled.

---

The invention described herein was made in the course of, or under, a contract with the U.S. Atomic Energy Commission.

In solid pulsed neutron sources, the extent of the excursion is limited by material strengths and difficulty of heat extraction. These limitations have pointed toward the use of liquid nuclear fuels. Previous such devices have maintained the fuel in a containment vessel in a more or less stationary position and the excursion has been initiated by withdrawal of a poison. Such a configuration has several inevitable disadvantages such as the limited speed of poison withdrawal and stresses in the containment vessel. In addition, since substantial heat is generated and must be dissipated, tubes or other cooling devices are required. Since these are in close proximity to the fuel, they necessarily limit the amount of available excess reactivity. The generated pressure and shock in such confined geometries require that the container be of high strength (again limiting the excess reactivity and leakage flux). Furthermore, since the reactor core normally remains intact, the background intensity caused by delayed neutron and gamma ray activity is high on experimental samples.

The present reactor concept makes use of the idea of projecting a highly supercritical slug of liquid fuel from a heavily poisoned region into a large cavity. The liquid slug is then violently disrupted across the cavity and deposited over the large cooled internal surface area of the cavity. Liquid slugs moving at suitably high velocities maintain their geometries over a considerable flight path.

Several inherent advantages for such a pulsed reactor are apparent. The size of the excursion is limited only by the excess reactivity available and the heat capacity and vapor pressure of the fuel solution, rather than the normal mechanical strength considerations of the fuel and container. The large amount of heat energy generated by the pulse can be dissipated by the large surface area of the containment cavity. The background intensity is less than in any present fission source system since the reactor is completely disassembled by the pulse, thus leading to a minimum delayed neutron and gamma ray activity and a maximum signal-to-noise ratio. The device is repetitive at a rate determined by the reassembly time of the fuel in the poisoned region.

Figure 1:
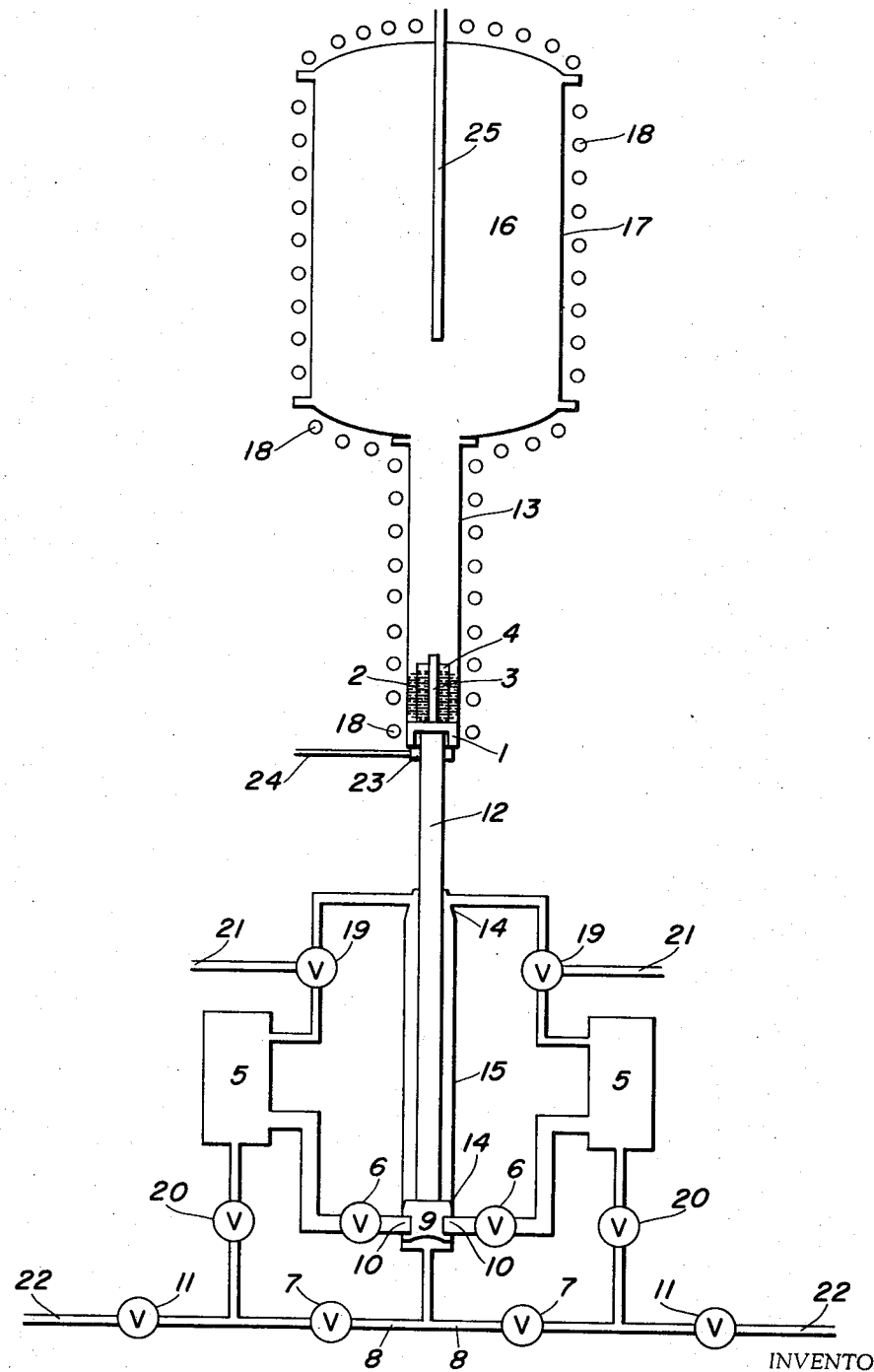
FIGURE 1 is a schematic cross section of the pulsed reactor of the present invention before the liquid fuel is accelerated.

Referring to FIGURE 1 it will be seen that piston 1 is in the down position. On top of this piston a column (or "slug") of liquid nuclear fuel 2 rests. This slug of fuel is highly supercritical but poison rod 3, a plurality of poison fins 4, and poison lining the top of the piston and sides of the cylinder maintain the slug in a subcritical state while resting on top of piston 1. Upward movement of piston 1 may be effected by any suitable means such as the hydraulic means shown in the drawing.

Hydraulic fluid is pressurized in a plurality of accumulators 5 from a sump pump with valves 11 and 20 open and valves 6 and 7 closed. The reaction cycle is started by closing valves 20 and 11 to the reservoir (not shown), opening valve 6 and opening trigger valve 7 in the small ducts 8. Piston 9 will slowly be forced upwards until the bottom of piston 9 reaches the large orifices 10. At this time piston 9 accelerates upward rapidly owing to the flow of hydraulic fluid through the large orifices 10. Since pistons 1 and 9 are rigidly connected by shaft 12, piston 1 will travel up cylinder 13 pushing the slug of nuclear fuel 2 up before it.

Figure 2:
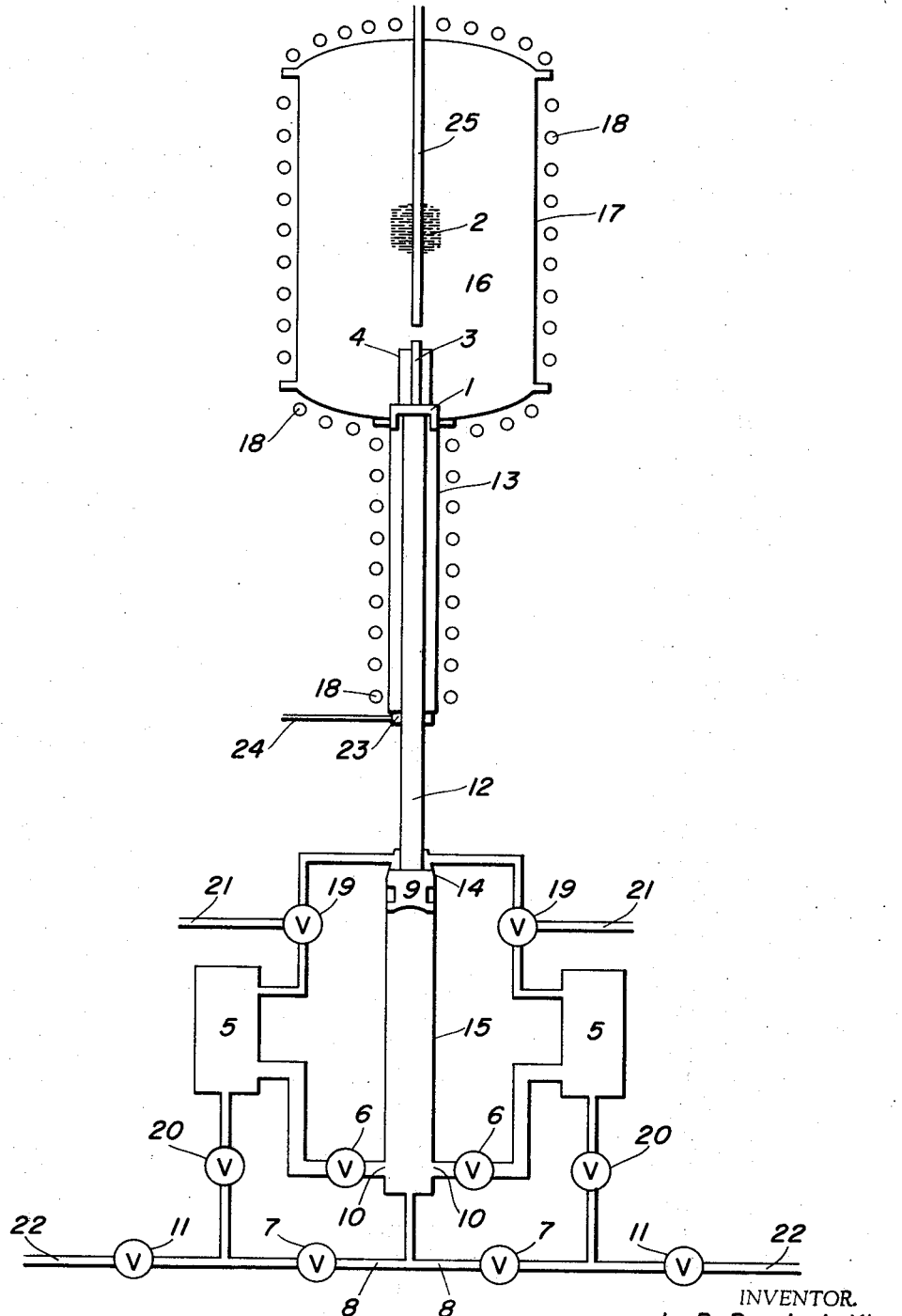
FIGURE 2 is a schematic cross section of the pulsed reactor of the present invention with the piston in the up position and the liquid fuel in the position where maximum energy release is reached.

In the up position as illustrated in FIGURE 2, piston 9 (and piston 1) are brought to a controlled stop by contact of bevelled surface 14 of piston 9 with the sloping upper surface of cylinder 15. If the terminal velocity of the pistons 1 and 9 (and fuel slug 2) is sufficiently high (about 250 ft./sec. is suitable) the slug released at this high velocity will essentially maintain its geometry during flight times of several slug lengths.

It will be noted that piston 1 extends slightly into the cavity 16 formed by container 17. This is done so that the cavity gas will have easy access to the interface between slug 2 and the top of piston 1. In the absence of this feature, when the slug separates from the piston, a vacuum could be formed thereby tending to retard the movement of the slug and change its bottom configuration.

FIGURE 2 shows the slug of fuel in about the center of cavity 16. During its travel to such position the poison in rod 3 and fins 4 exert less and less of an effect so that the slug abruptly goes supercritical and releases a large burst of neutrons. The slug is then violently disrupted by its internal nuclear energy. The fuel is accelerated to the walls of container 17 (which is cooled by cooling tubes 18), condensed and runs back down the sides. Piston 1 is returned to the bottom position shown in FIGURE 1 by opening valve 19 to the accumulator, closing valves 6 and 20 and opening valves 7 and 11 to the reservoir. Lines 21 all run to a common reservoir which is connected by a pump (not shown) to lines 22. Accumulators 5 can then be repressurized by this pump.

Conventional hydraulic seals are utilized throughout the system. At seal 23 a line 24 is provided to bleed a gas such as helium between piston 1 and cylinder 13 (when piston 1 is in the bottom position) to prevent leakage of liquid fuel into the clearance between piston and cylinder.

A radiation and neutron beam "glory hole" tube 25 is aligned with poison rod 3 so that the fuel slug geometry is maintained in its upward travel. This glory hole is hollow to accommodate samples to be irradiated or it may be filled with scattering material to provide a radiation beam along the axis of the tube 25. In addition, the invention encompasses the use of one or more tubes extending from the walls of container 18 to points proximal to the position of the fuel slug while supercritical.

In the specific embodiment thirty-two 10-liter accumulators are used which feed into eight 4-in. headers which in turn are connected to cylinder 15 by orifices 10. Hydraulic cylinder 15 has a 14-in. diameter bore and shaft 12 is 8 in. in diameter. The sump pump between the reservoir and line 11 is rated at 3000 p.s.i. During each shot about 1½ liters is expelled from the accumulator to the hydraulic cylinder from each accumulator.

The top of piston 1, the walls of cylinder 13, rod 3 and vanes or fins 4 are lined with nuclear poisons such as $B^{10}$, Ag-Eu, Cd-Eu or In-Eu. Note that these can be present in large amounts so that the slug of fuel is highly subcritical without affecting the operation of the device.

Cylinder 13 is about 40 cm. inside diameter and about 6 ft. long. Cavity 16 is 5 ft. wide and 8 ft. high. If a 60 liter slug of fuel (about 48 cm. high) is used, a terminal velocity of 250 ft./sec. for piston 1 and LAPRE-2-type fuel (0.42 M $UO_2$+17.5 M $H_3PO_4$+4 M $H_2O$), an energy release of 33 megajoules and a total neutron production of $1.4 \times 10^{18}$ per shot is obtained. The uranium used is 93½% enriched in $U^{235}$. The neutron spectrum will be as set forth in Table I.

TABLE I.—CALCULATED NEUTRON SPECTRUM

| Neutron Energy | Neutrons/ Pulse | Peak Neutron Flux | Surface Leakage Flux |
|---|---|---|---|
| >1.4 mev | $0.5 \times 10^{18}$ | $0.5 \times 10^{18}$ | $0.5 \times 10^{17}$ |
| 0.4–1.4 | $0.2 \times 10^{18}$ | $0.4 \times 10^{18}$ | $0.4 \times 10^{17}$ |
| 0.017–0.4 | $0.2 \times 10^{18}$ | $0.4 \times 10^{18}$ | $0.4 \times 10^{17}$ |
| 0.55–17 kev | $0.14 \times 10^{18}$ | $0.3 \times 10^{18}$ | $0.3 \times 10^{17}$ |
| 30–550 ev | $0.1 \times 10^{18}$ | $0.2 \times 10^{18}$ | $0.2 \times 10^{17}$ |
| 3–30 | $0.1 \times 10^{18}$ | $0.2 \times 10^{18}$ | $0.2 \times 10^{17}$ |
| 0.1–3 | $0.1 \times 10^{18}$ | $0.2 \times 10^{18}$ | $0.2 \times 10^{17}$ |
| Thermal | $0.06 \times 10^{18}$ | $0.3 \times 10^{18}$ | $0.1 \times 10^{17}$ |
| Total | $1.4 \times 10^{18}$ | $2.5 \times 10^{18}$ | $2.3 \times 10^{17}$ |

The excess reactivity of such a slug is 13% (~16.3$). Using a starting fuel temperature of 275° K., then at critical the center temperature will be 495° K. and the edge temperature will be 295° K. At final disassembly the center will be about 500° K. and the edge about 300° K. Peak energy occurs at 3 msec. after poison removal and the disassembly velocity of liquid is about 3000 cm./sec. Past experience with the phosphate solution of the specific embodiment indicates that at the temperatures and pressures experienced, a high proportion of the formed radiolytic gases will be internally recombined.

The cooling capacity needed is, of course, a direct function of the repetition rate (number of shots per unit time). If as many as one shot per minute were made only 5 watts/cm.² need be extracted from the cavity. Using a LAPRE-2 type cooling system a cooling water temperature differential of only about 20° C. would be required. If for example very few nuclear bursts were used only the cylinder 13 would require cooling to remove residual fission product heating.

It will be noted that the above specific embodiment is not intended to limit the scope of the invention. For example, other liquid fuels (e.g., uranyl nitrate, sulphate or fluoride) may be used. In addition any means of propulsion are contemplated. The only requirements are that the liquid slug be propelled vertically from a poisoned region to an unpoisoned region without substantially losing its geometry until supercriticality is attained. The essential novelty is the placement of a slug of liquid fuel of known geometry in a highly supercritical unconfined geometry within a large cavity.

What is claimed is:
1. A liquid pulsed neutron source comprising a cavity, liquid nuclear fuel, means to place the liquid fuel while supercritical in an unconfined geometry within the said cavity, said means to place the liquid fuel being capable of propelling the liquid fuel with such velocity that the liquid fuel substantially maintains its geometry until said fuel reaches the center portion of said cavity.
2. A pulsed neutron source as in claim 1 wherein cooling means are provided completely external to said cavity to cool the walls of said cavity.
3. A pulsed neutron source as in claim 1 wherein the liquid nuclear fuel is a solution of uranyl phosphate.
4. A pulsed neutron source as in claim 1 wherein the means to place the liquid fuel include piston means in a cylinder at the base of the cavity and means are provided to propel the said piston means.
5. A pulsed neutron source as in claim 4 wherein neutron poison means are provided on the top of said piston, on a rod on top of said piston, on a plurality of fins attached to said rod, and along the walls of the cylinder through which said piston means travel.

References Cited

UNITED STATES PATENTS

| 2,904,488 | 9/1959 | Thamer et al. | 176—46 |
| 3,030,454 | 8/1962 | Barr et al. | 176—46 |

OTHER REFERENCES

Soviet Journal of Atomic Energy, vol. 5, No. 6, December 1958, pp. 1533–1536, by Zubarev.

CARL D. QUARFORTH, *Primary Examiner.*

H. E. BEHREND, *Assistant Examiner.*